United States Patent [19]

Shelby et al.

[11] 3,821,617
[45] June 28, 1974

[54] FILM TYPE CAPACITOR AND METHOD OF ADJUSTMENT

[75] Inventors: James Henry Shelby, Greenfield; Fred Eric Richter, Indianapolis, both of Ind.

[73] Assignee: RCA Corporation, New York, N.Y.

[22] Filed: June 18, 1973

[21] Appl. No.: 370,615

[52] U.S. Cl. ............... 317/261, 29/25.42, 317/242
[51] Int. Cl. .................................................. H01g 3/26
[58] Field of Search .......... 317/242, 261; 29/25.42

[56] References Cited
UNITED STATES PATENTS

| | | | |
|---|---|---|---|
| 2,968,752 | 1/1961 | Rubinstein | 317/261 X |
| 3,402,448 | 9/1968 | Heath | 317/261 X |
| 3,456,170 | 7/1969 | Hatch | 317/261 X |
| 3,611,051 | 10/1971 | Puppolo | 317/261 X |

Primary Examiner—E. A. Goldberg
Attorney, Agent, or Firm—Glenn H. Bruestle; William S. Hill

[57] ABSTRACT

An encapsulated film type capacitor which has a tail portion extending outwardly from the main body. Also a method of adjusting the capacitance value prior to encapsulation, comprising trimming off an end area of the top electrode on the tail portion.

5 Claims, 4 Drawing Figures

PRIOR ART

FILM TYPE CAPACITOR AND METHOD OF ADJUSTMENT

BACKGROUND OF THE INVENTION

Film type capacitors usually comprise a lower electrode composed of a film of metal deposited on an insulating substrate, a film of a dielectric material deposited on top of the lower metal electrode film and a top electrode which comprises a metal film deposited on top of the dielectric layer.

Because of various changes that normally occur during a long production run of printed capacitors (which are usually a part of a hybrid type miniaturized circuit), the capacitance values of the capacitors usually vary considerably. Although a certain range of capacitance values for a given capacitor is usually permitted by circuit configurations, if the value of a given capacitor falls outside the tolerance range, the capacitance of the capacitor must either be adjusted to bring it back within the accepted range, or the entire circuit must be discarded.

From a practical production standpoint, it is usually not feasible to increase the capacitance of a printed (or other film type) capacitor after it is fired. However, it is relatively easy to decrease the capacitance value. This may be done by trimming off a part of the top electrode of the capacitor, sufficient to reduce the capacitance to the extent desired. Trimming may be done by various methods such as by using a stream of fine abrasive powder, or with a laser beam. Because of the inability to easily increase the capacitance value of a film type capacitor, printed capacitors are usually designed such that the inevitable production variations produce mostly capacitors which are out of tolerance on the high side rather than the low side, if they are out of tolerance at all.

In order to detect those capacitors in need of trimming to reduce their capacitance values, each capacitor is tested after it is completed. If the test indicates that an adjustment in capacitance is needed, a calculated amount of the top electrode is removed. Apparatus now exists for accomplishing all of this testing and removal automatically.

However, other factors sometimes enter into the complete picture, which must of necessity include a knowledge of what the values of each circuit component will be when the circuit is completed and ready to be used. For example, production steps that occur after the capacitor is tested and trimmed may so change the capacitance value that it is again outside the tolerance range. This, of course, may result in a faulty circuit.

The present invention includes an improved film type capacitor design and a method of trimming that tends to increase the percentage of capacitors within tolerance range after a circuit is completed.

THE DRAWING

Figure 1:
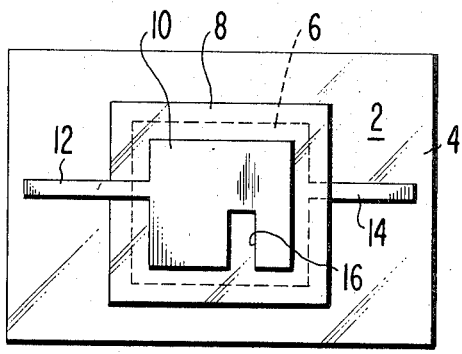
FIG. 1 is a top plan view of a prior art film type capacitor after it has been trimmed.

As shown in FIG. 1, a prior art film type capacitor 2, supported on an insulating substrate 4, which may be a ceramic plate or other dielectric body, comprises a square bottom metallic electrode 6, (shown in dotted outline) a dielectric layer 8 deposited on top of the bottom electrode 6, and a top metallic electrode 10 deposited on top of the dielectric layer 8. The dielectric layer 8 has an area somewhat larger than either of the metal electrodes 6 and 10 to increase the leakage path and to give greater assurance against shorting. The capacitor also includes a first metal tab 12 connected to the top electrode 10, and a second metal tab 14 connected to the bottom electrode 6.

The prior art type capacitor 2 may be trimmed to reduce its capacitance by abrading or otherwise removing material in the form of a notch 16 cut in from an edge of the top electrode 10. However, the percentage reduction of capacitance is less than the percentage reduction of area of the top electrode. There are certain edge effects, due to the slot configuration, which result in a higher capacitance value than would normally be expected. For example, a differential small capacitance is introduced because the metal around the edge of the top electrode is influenced by the metal of the bottom electrode which extends out beyond the periphery of the top electrode. The dielectric of this differential capacitance is partly air and partly the dielectric film 8. The longer the periphery of the notch, the greater is the value of the differential capacitance.

The differential capacitance introduced by cutting a notch, such as the notch 16, is not a particular problem in making hybrid circuits if the capacitor is not to be encapsulated. However, if the capacitor must be given a coating of encapsulant (not shown in FIG. 1) in order to protect it, an actual increase in capacitance occurs because the air portion of the dielectric around the periphery of the notch is now replaced with a solid dielectric having many times the dielectric constant of air. Since this change in capacitance occurs after the capacitor has been tested, and because the change is more or less unpredictable due to irregularity of outline and lack of precision in controlling the area and shape of the removed portion, it introduces an uncertainty factor into the final result. Sometimes the added unpredictable capacitance is enough to throw the total capacitance of the capacitor outside the acceptable tolerance range and to thus cause possible discard of the entire circuit. The added capacitance which is due to the solid dielectric introduced around the outer edges of the main body of the capacitor is predictable and controllable because the dimensions of these edges are known and the shape is regular.

The present invention resides in providing a film type capacitor of improved design such that trimming does not introduce any increase in fringe capacitance and such that encapsulation does not cause any significant change in capacitance.

Figure 2:
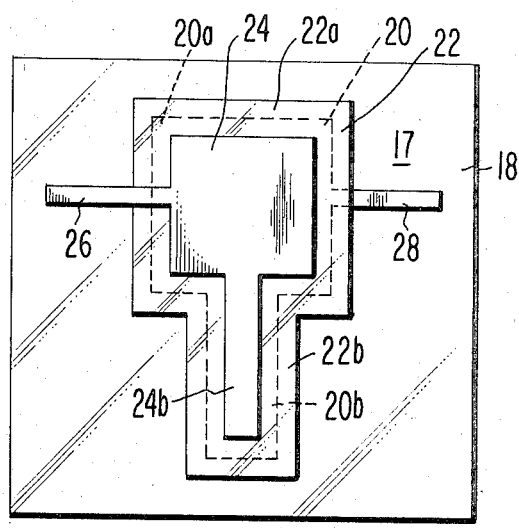
FIG. 2 is a similar view of an improved film type capacitor of the present invention.

An example of an improved capacitor 17 in accordance with the present invention is shown in FIG. 2. The capacitor 17 is supported on an insulating substrate 18. The capacitor 17 comprises a bottom metallic electrode 20 which has a square main body portion 20a deposited on the substrate 18 and a relatively narrow tail portion 20b extending outward at a right-angle to an edge of the main body portion 20a. The capacitor includes an intermediate dielectric layer 22 having a main body portion 22a and a tail portion 22b. The capacitor also includes a top electrode layer 24 which has a main body portion 24a and a tail portion 24b. A connecting metal tab 26 is connected to the body portion 24a of the top metal electrode and another tab 28 is connected to the body portion 20a of the bottom electrode. Although there are no critical dimensions of the body portions in relation to the tail portions of the electrodes, it is preferred to have the tail portions from about ¼ to ½ the width of the body portions. In typical embodiments, the width of the tail portion 24b of the top electrode was 50 mils and the width of the body portion 24a was 100–200 mils.

Figure 3:
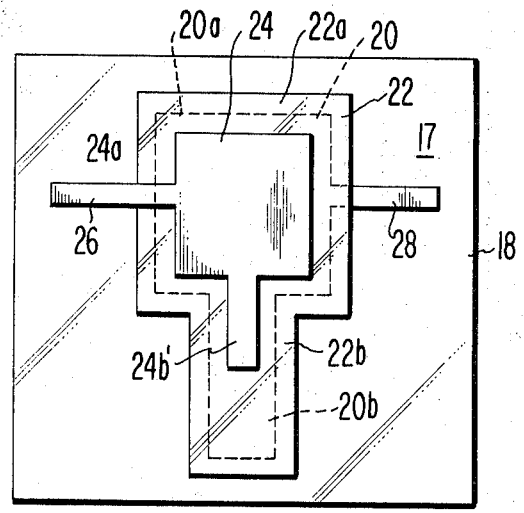
FIG. 3 shows the capacitor of FIG. 2 after it has been trimmed.

The capacitor is adjusted by trimming off an end portion of the tail portion 24b (FIG. 3). The cut is made across the entire width of the tail so that the end of the trimmed portion is rectangular. It will be noted that, unlike the cutting of a notch in prior art methods, the present method does not increase the length of the periphery of the capacitor. Instead, the length of the periphery is decreased somewhat and the general outline remains constant. A further advantage of the present invention is that the amount of capacitance change per increment of trim is more predictable and controllable.

Figure 4:
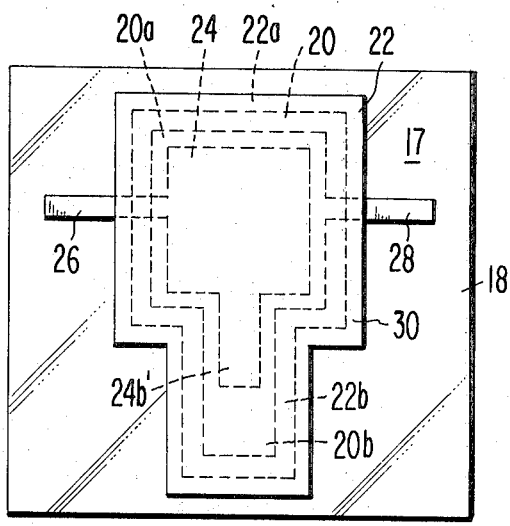
FIG. 4 shows the trimmed capacitor of FIG. 3 after encapsulation.

As shown in FIG. 4, the entire capacitor 17, except for the ends of metal tabs 26 and 28, may be covered with a protective coating 30 of a synthetic resin, for example. In the present case, the presence of the solid dielectric on the trimming edge of the tail portion 24b' of the top electrode 24 increases the fringe capacitance very little and the change is predictable.

Although film type capacitors are known having trimmable tail portions, these prior art capacitors have the tail disposed parallel to and close beside the main body of the capacitor. Such a tail portion cannot safely be trimmed by automatic machinery making a pass across the tail since the main body of the capacitor would often be damaged. Also, it was previously taught that trimming of such tail portion should be done by cutting a notch leading in from the end of the tail so that undue moisture would not be admitted.

We claim:

1. A process comprising depositing on an insulating substrate a film type capacitor having top and bottom metallic electrodes and a layer of dielectric material between said electrodes, said electrodes including a main body and a narrow tail portion extending outward therefrom, adjusting the capacitance of said capacitor to a desired value by trimming off an end part extending entirely across at least the top electrode of said tail portion, and depositing a coating of insulating material over at least the end of said top electrode bordering said trimmed off portion.

2. A process according to claim 1 in which said main body of said top electrode has a length or width of about 100–200 mils and said tail portion has a width of about 50 mils.

3. A trimmed film type capacitor comprising a bottom metallic electrode adhered a substrate with a terminal, a top metallic electrode with a terminal and a layer of dielectric material between said electrodes, said electrodes including a main body portion and a tail portion extending outwardly from said body portions at a substantially right-angles, the end portion of said top electrodes being a trimmed portion having a rectangular shape.

4. A capacitor according to claim 3 in which said tail portion of the top electrode has a width which is about ¼ to ½ that of said body portion.

5. A capacitor according to claim 4 in which said top electrode has an area less than said bottom electrode.

* * * * *